United States Patent

Danø

[11] 4,059,396
[45] Nov. 22, 1977

[54] CEMENT MANUFACTURE

[75] Inventor: Tage Halfdan Danø, Copenhagen Valby, Denmark

[73] Assignee: F. L. Smidth & Co., Cresskill, N.J.

[21] Appl. No.: 618,819

[22] Filed: Oct. 2, 1975

[30] Foreign Application Priority Data

Oct. 3, 1974 United Kingdom .............. 42989/74

[51] Int. Cl.$^2$ ........................ F27D 15/02; F26B 19/00
[52] U.S. Cl. ..................................... 432/78; 432/106; 432/117; 106/101
[58] Field of Search .................... 106/101; 432/14, 58, 432/106, 103, 80, 117, 78, 85

[56] References Cited

U.S. PATENT DOCUMENTS

| 3,074,705 | 1/1963 | Dano et al. | 106/101 |
| 3,089,688 | 5/1963 | Ostberg | 432/14 |
| 3,595,543 | 7/1971 | Tresouthick | 106/101 |
| 3,836,321 | 9/1974 | Kobayashi et al. | 432/80 |
| 3,839,803 | 10/1974 | Dick | 432/78 |
| 3,892,044 | 7/1975 | Kayatz | 432/58 |

Primary Examiner—John J. Camby
Assistant Examiner—Henry C. Yuen
Attorney, Agent, or Firm—Pennie & Edmonds

[57] ABSTRACT

A method is disclosed for manufacturing white cement wherein cement clinker is burnt in a kiln and prior to discharge from the kiln the clinker is contacted with a reducing agent such as fuel oil. The method further comprises discharging the hot cement clinker from the discharge portion of the kiln to a movable clinker supporting means such as a rotatable conveyor and quenching the cement clinker simultaneously with the discharge thereof from the kiln by subjecting the clinker to a spray of cooling water in a manner such that a major portion of the quenching water evaporates substantially immediately following the quenching. The method further comprises transferring the cement clinker to a clinker transporting means such as a linear conveyor and subjecting the clinker to further cooling while evaporating substantially all of the remaining quenching water, and creating and maintaining a sub-atmospheric pressure at the location of discharge of the hot cement clinker from the kiln to prevent evaporating water from entering the kiln. The invention also pertains to plant for practicing the inventive method.

14 Claims, 1 Drawing Figure

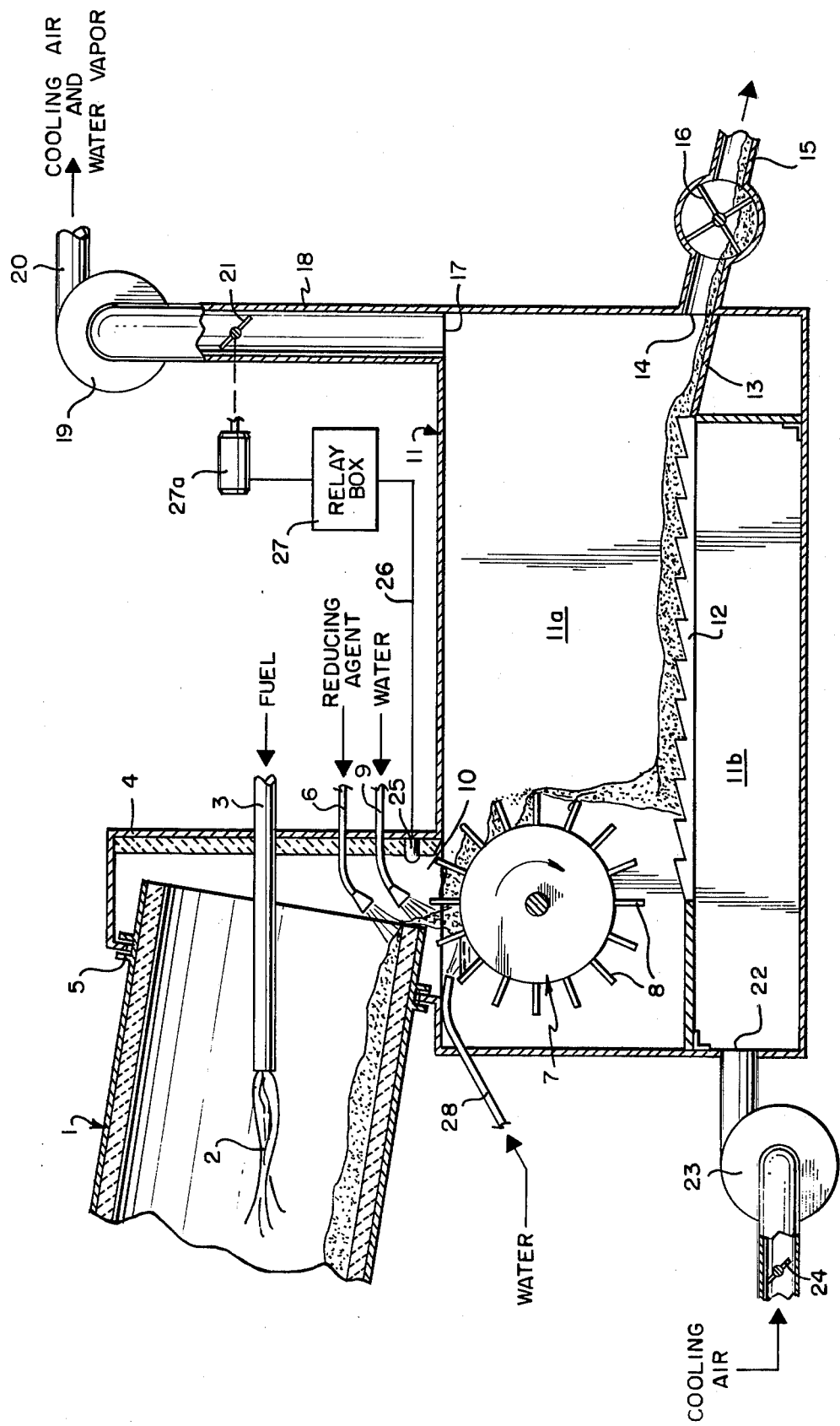

CEMENT MANUFACTURE

BACKGROUND OF THE INVENTION

1. Field of the Invention

This invention relates to a method of subjecting cement clinker burned in a rotary kiln to a reduction, by spraying the clinker with a reducing agent, and subsequently cooling it. The invention also relates to a plant for practicing the improved method.

2. Description of the Prior Art

A known method for producing white cement consists in effecting the reduction of the cement clinker inside the kiln. The reducing agent is added to the clinker at a high temperature, and water is sprayed on the clinker by means of nozzles immediately afterwards so as to effect a quenching. This method not only produces the well known effect on the whiteness of the cement due to quenching, but also prevents oxidation by ensuring that no air is admitted during the addition of the reducing agent to the clinker so that reoxidation is prevented.

This method has been found to produce a very favourable whiteness of cement in practice. Furthermore, the method has the advantage that the clinker is perfectly dry when leaving the kiln system, making extra drying unnecessary.

However, a drawback of the method is that a proportion of the water vapours generated by the water cooling enter the kiln together with the smoke from the combustion, even when means are provided for removing a maximum amount of water vapour by suction. This inevitable amount of water vapour results in an increased heat consumption in the burning step and thus a lower production of the rotary kiln than that which would be attained without the presence of the water vapour.

Commonly assigned U.S. Pat. No. 3,074,705 to Dano et al relates to such a treatment where material traveling through a rotary kiln is reduced in the kiln by directing a conical spray of a reducing agent upon an area of the inclined surface of the moving burned material with the axis of the spray normal to the inclined surface. The reduced material is cooled by directing a conical spray of cooling agent upon a closely adjacent area of the inclined surface of the material, with the axis of the spray normal to the inclined surface. The material burned is a raw material suitable for the production of white cement.

It is also known to effect water cooling of the clinker outside the rotary kiln. Usually, this step is performed by causing the clinker when discharged from the kiln to fall into a water bath from which it is rapidly removed, for example, by means of a drag chain. This method, although ensuring that the water vapour is prevented from entering the kiln, has two essential drawbacks. First, the whiteness obtained in practice is inferior to the whiteness obtained by the former method, and secondly, the clinker has a water content of 10–12% after the process. This requires a supplementary drying, i.e., a supply of extra heat. The water content also reduces the strength of the cement manufactured from such clinker because a certain amount of hydration is inevitable. I have invented a method and plant for producing cement in which the disadvantages of the prior art are avoided, and the advantages are successfully and usefully combined to produce an improved product.

SUMMARY OF THE INVENTION

The invention relates to a method of manufacturing cement comprising burning cement clinker in a kiln, contacting the hot cement clinker with a reducing agent prior to discharging the clinker from a discharge portion of the kiln. For an inclined rotary kiln the discharge portion is located at the lower end of the kiln. The method further comprises discharging the hot cement clinker from the discharge portion of the kiln to a movable clinker supporting means and quenching the cement clinker simultaneously with the discharge thereof from the kiln by subjecting the clinker to a spray of cooling liquid such as cooling water, in a manner such that a major portion of the quenching liquid evaporates substantially immediately following the quenching. The method further comprises transferring the cement clinker to a clinker transporting means such as a pneumatic conveyor, and subjecting the cement clinker to further cooling while evaporating substantially all of the remaining cooling water, and creating and maintaining sub-atmospheric pressure at the location of discharge of the hot cement clinker from the kiln to prevent evaporating water from entering the kiln.

Advantageous features of the invention which particularly distinguish over the known methods pertain to the quenching of the clinker being carried through outside the kiln, the discharged clinker being sprayed with water to such an extent and under conditions that the ready cooled clinker will be completely dry. At the same time water vapours are prevented from reaching the kiln.

While the quenching is effected by the evaporation of the water sprayed onto the clinker, only about 85-90% of the water evaporates at this stage, the remaining amount of water being reserved for the treatment to which the clinker is subjected on the lower conveyor. The shock cooling or quenching will not reach as far as the core of the individual clinker pieces, particularly the larger ones and for this reason the initial cooling or quenching is succeeded by a supplementary cooling which takes place on the lower conveyor. During this supplemental treatment the remaining part of the water is evaporated so as to cool the clinker further. At the same time a temperature equalization takes place with the result that upon completion of this treatment the clinker will be completely dry, having throughout attained the desired low final temperature.

At the quenching of the clinker is initiated immediately after leaving the kiln, and as the reduction of the clinker should take place before the quenching, it is preferable to spray the reducing agent on to the clinker inside the kiln directly before the clinker leaves the kiln. A preferred reducing agent is fuel oil having a viscosity of 15° Engler (approximately 110 centistokes). The reducing agent may be atomized in a special unit by means of steam or air when being sprayed on the clinker.

During the finishing cooling and temperature equalization the clinker is preferably distributed in a layer and advanced on the lower advancing support which is air-permeable. Cooling air is blown or drawn through the support and the layer of clinker as a traverse current coming from the underside of the support. Thus not only the evaporation of the remaining water but also the air-flow passing through the clinker layer, contribute to the cooling and the temperature equalization of the clinker. In addition the air-flow takes with it the water vapour, so that the clinker on reaching the discharge end of the lower advancing support, is completely dry and cooled down.

Preferably the amount of cooling water is 30-40% by weight that of the clinker. The method makes it possible to achieve the desired quenching of the clinker thereby avoiding using such large amounts of water that the clinker is moistened. Thus hydration — which diminishes the strength of the cement clinker — is avoided.

It is also advantageous if both the amount of water sprayed onto the clinker per unit time and the speed at which the clinker is conveyed by the two conveyors are selectively variable. When the advancement of the upper conveyor is controlled in a manner such that the clinker is retained in the water spray, for example, from 2-20 seconds, and the advancement of the lower advancing support is much slower, such as, say 2-5 minutes, or more. Under such conditions it has been found that satisfactory cooling conditions are obtained.

Division of the stream of clinker discharged from the kiln is advantageous because the division into small separate portions promotes an intense quenching of the clinker. Preferably water is also sprayed onto the upper conveyor at a point just before it receives the hot clinker in such a manner that the clinker falls into this water. The amount of water such added will contribute to the quenching of the clinker, and prevents damage to the support by the hot clinker when it falls onto the upper conveyor.

A plant is disclosed for producing cement which comprises a kiln for burning cement clinker, means to contact the cement clinker with a reducing agent prior to discharge from the kiln, first means to movably support the cement clinker discharged from the kiln, with means to spray cooling liquid such as water on the clinker while it is discharged on to the support means. The invention further comprises second clinker supporting means to support clinker transferred from the first support means and for further cooling the clinker and means to produce sub-atmospheric pressure at the location of discharge of the hot cement clinker from the kiln to prevent water evaporating from the cement clinker from entering the kiln. Preferably the clinker used is of the type intended for manufacturing white cement. Raw material of the desired type is sintered in a rotary kiln and thereafter treated according to the invention.

Preferably, the first support means is an upper conveyor consisting of a cylindrical drum rotatable about a horizontal axis, and having its surface formed with cells which are arranged to catch portions of the clinker falling from the kiln, the walls and bottom of the cells consisting of or being lined with a refractory material.

The kiln is preferably a rotary kiln having one or more stationary pipes arranged so as to spray the clinker with a reducing agent inside the kiln immediately before discharge. The kiln outlet is provided with one or more spray pipes to cool the clinker simultaneously with conveying it and the lower conveyor is air penetrable and positioned substantially horizontally beneath the upper advancing support, to receive the partially cooled clinker and convey it in a layer to a discharge point, means being provided for passing the air transversely through the lower conveyor and the layer of clinker thereon.

The casing surrounding the upper and lower conveyors may be divided into upper and lower parts by the lower conveyor. An opening for the supply of cooling air is provided in the lower part of the casing. Openings for admission of hot clinker and for discharge of cooled clinker, as well as the opening for discharge of spent cooling air, are provided in the upper part of the casing. The opening for the discharge of spent cooling air is positioned in communicating relationship with the suction side of a fan for drawing the cooling air through the lower conveyor, and means being provided for automatically creating and maintaining a reduced pressure in the casing to prevent the passage of water vapours through the opening into the kiln.

Further control of the cooling process may be obtained when the opening for admission of cooling air provided in the lower part of the casing is equipped with a fan, having means for regulating its speed.

BRIEF DESCRIPTION OF THE DRAWINGS

A preferred embodiment of the invention is described hereinbelow with reference to the sole drawing which illustrates a vertical longitudinal section of the outlet portion of a plant for treating cement clinker according to the invention.

DETAILED DESCRIPTION OF THE PREFERRED EMBODIMENT

The drawing represents the discharge portion of the lower end 1. of a rotary kiln to be used in the manufacture of white cement according to the invention. A charge of burned clinker is indicated at the lower portion of the kiln, and the clinker falls as a stream down from the outlet end of the kiln. The burning in the kiln is effected by the heat developed in a flame 2 formed at the end of a burner pipe 3 extending into the kiln from a casing 4 surrounding the discharge portion of the kiln. A seal 5 of a conventional kind tightens the casing 4 against the kiln wall.

A spray pipe 6 for spraying the clinker with reducing agent, preferably fuel oil, extends from the casing 4 towards the kiln mouth, with its end turned so as to point just at the clinker which is about to leave the kiln. As a result of this arrangement the clinker is reduced before falling onto a rotating cell drum 7 positioned below the kiln outlet and rotated by means (not shown) in the direction indicated by the arrow. The cell drum consists of a hollow metallic drum which has radial fins 8 on its circumference which, together with circular plates provided at the ends of the drum, create compartments at the surface of the drum. The clinker falling from the kiln is caught in the compartments and divided up into portions which are advanced away from the kiln end due to a slow rotation of the drum. Simultaneously the clinker is sprayed with cooling water through a spray pipe 9 passing through the casing 4 and having its mouth positioned, so as to be able to spray both the falling clinker stream falling from the kiln and the cells of the cell drum.

As a result of the simultaneous spraying the clinker is quenched, and 85-90% of the water evaporates substantially immediately, the time period being usually between 2 and 20 seconds, according to the circumstances. The passage of the clinker from the casing 4 and to the cell drum 7 takes place through an opening 10 provided in a casing 11 surrounding the cell drum 7. The casing 11 also houses a lower pneumatic conveyor 12 which divides the casing 11 into an upper and a lower part, 11a and 11b. The lower advancing support may be any conventional horizontal air-penetrable conveyor capable of facilitating material transfer at a regulatable speed. A layer of clinker is formed by the clinker portions falling freely from the cell drum 7 as shown in the drawing on to the adjacent end of the lower conveyor. The clinker layer is subsequently pushed onto a sloping guide surface 13 along which it slides out of the casing 11 through an opening 14 provided for that purpose. The cooled clinker flows out into a sloping pipe 15 provided with a sluice 16 of known kind which prevents atmospheric air from being sucked into the casing.

Another opening, 17, is also provided in the casing 11 and communicates with a pipe 18 leading to the suction side of a fan 19, the pressure side of which is connected to a pipe 20 provided to lead away the spent cooling air and the water vapor contained therein. In the pipe 18 a damper 21 is provided to control the draught of spent cooling air passing up through the pipe 18. The air removed from the casing 11 under the influence of the draught passing through pipe 18 is replaced by fresh air entering into the casing 11 through an opening 22 which is provided in the casing below the lower advancing conveyor 12 which is represented diagrammatically. The opening 22 may allow a direct passage of atmospheric air therethrough under the influence of the draught created by the fan 19. However, due to the pressure drop caused by the passage of the cooling air through the lower advancing conveyor 12 it is advantageous to force the cooling air through the opening 22. This is accomplished by connecting the pressure side of a fan 23 to the opening 22. At the suction side of this fan a damper 24 is provided to regulate the capacity of the fan.

The flow of cooling air passed through the clinker layer, sprayed out on to and advanced by the lower advancing support 12, contributes together with the evaporation of the amount of water still present in the layer to the final cooling and temperature equalization of the clinker. The clinker on reaching the discharge end of the lower support is completely dry, and at a temperature of approximately 100° C.

A pressure sensor 25 is provided near the opening 10 in the casing 11. It is designed to give electrical signals when the sub-atmospheric pressure near the opening 10 in the casing 11 passes below a given minimum or above a given maximum value. These signals are transmitted through electrical conduits 26 to a relay box 27 and then to a pilot motor 27a which controls the position of the damper 21 in the pipe 18. This arrangement ensures that the sub-atmospheric pressure in the opening 10 is kept constantly at such a value that no air passes from the casing 11 through the opening 10 into the casing 4 thus preventing water vapor from passing into the kiln. However, a negligible flow of air (false air) passes in the opposite direction because the pressure in the casing 11 is lower than the pressure in the casing 4. This facilitates the evacuation of all the water vapor present in the casing 11 through the pipe 18 by means of the fan 19.

The sub-atmospheric pressure in the casing 11 may for example be 2 mm. water gauge (w.g.). If the pressure sinks below that value the damper 21 is closed until the pressure decrease is halted and the desired pressure restored. If the pressure rises above the given value the damper is opened, until the desired pressure is restored.

In the upper left hand corner of the casing 11 a pipe 28 is shown. This pipe pours an amount of water into every compartment of the cell drum 7, immediately before the compartment in question is rotated into the position in which it receives the clinker. The compartment is simultaneously subjected to waterspray from the spray pipe 9.

The purpose of this addtional water is to cool somewhat the compartment which, at this position is still hot. Further, in this manner the cell drum and a refractory lining of the drum and the cells may be protected from damage by the hot clinker in that a sudden rise in temperature upon addition of hot clinker is prevented.

I claim:

1. A plant for producing cement which comprises:
   a. an inclined rotary kiln for burning cement clinker having an upper material inlet and portion and a lower material outlet end portion for discharge of the clinker;
   b. stationary means positioned and adapted to spray the cement clinker with a reducing agent immediately prior to discharge of the clinker from the kiln proper;
   c. a cylindrical drum rotatable about its axis positioned adjacent the lower material outlet end portion of the kiln, said cylindrical drum having on its surface means defining at least one compartment configured to receive discrete portions of the clinker discharged from the kiln;
   d. means to spray cooling liquid such as water onto the clinker substantially immediately after said clinker is discharged from the kiln and while being trasnferred onto said cylindrical drum;
   e. clinker support means positioned below said cylindrical drum and adapted to receive clinker transferred from said cylindrical drum and to facilitate movement of the clinker away from said cylindrical drum while simultaneously being cooled thereon;
   f. casing means to enclose the atmosphere adjacent said lower material outlet end portion of the kiln in substantially sealed relation therewith;
   g. stationary pipe means positioned to supply a portion of a cooling liquid such as water successively into at least one of the compartments of said cylindrical drum prior to receipt of hot clinker into said compartment; and
   h. means to control the pressure of the atmosphere within said casing means so as to be less than the pressure of the atmosphere within the material outlet end portion of the kiln so as to prevent cooling liquid evaporating from the cement clinker exiting the kiln from entering the kiln proper, thereby maintaining at minimum levels the liquid contact and heat losses occurring within the kiln proper.

2. The plant according to claim 1 wherein said stationary means for contacting cement clinker with a reducing agent comprises at least one stationary pipe positioned within the kiln proper and adapted to spray the clinker with a reducing agent substantially immediately prior to discharge from the kiln.

3. The plant according to claim 2 wherein said clinker support means comprises a linear air permeable conveyor positioned below said cylindrical drum and adapted to receive clinker from said cylindrical drum and to facilitate movement of said clinker away from the lower material output end portion of the kiln.

4. The plant according to claim 3 wherein said casing means comprises a casing attached in sealed communicating relationship with the lower material outlet end portion of the rotary kiln.

5. The plant according to claim 4 wherein said compartment defining means comprises a plurality of radial fins connected to outer peripheral portions of said cylindrical drum and an annular plate member connected to the end portions of the radial fins so as to form compartments and at least one compartment of said cylindrical drum having a lower portion and a wall portion lined with a refractory material.

6. The plant according to claim 5 wherein said casing is configured to enclose the atmosphere adjacent said lower material outlet end portion of the kiln and to encompass the cylindrical drum and the air permeable conveyor, said air permeable conveyor dividing said casing into an upper compartment and a lower compartment.

7. The plant according to claim 6 further comprising inlet means communicating with the lower compartment of the casing for supplying clinker cooling air thereto and outlet means communicating with the upper chamber of the casing for discharging clinker cooling air therefrom.

8. The plant according to claim 7 further comprising inlet means communicating with said upper compartment of said casing for supplying hot clinker thereto and outlet means communicating with the casing at a location and in such a manner so as to discharge at least partially cooled and dried clinker therefrom.

9. The plant according to claim 8 wherein said means for controlling pressure comprises a fan having a suction side which communicates with the clinker cooling air outlet means of the upper compartment of the casing for the discharge of spent cooling air and water vapor from said casing.

10. The plant according to claim 9 wherein said fan is positioned and adapted to draw clinker cooling air admitted to the clinker cooling inlet means of the lower compartment of the casing through the air permeable conveyor thereby additionally subjecting the clinker deposited thereon to further cooling and drying and to thereafter discharge said spent clinker cooling air from said casing.

11. The plant according to claim 10 wherein said means for controlling pressure of the atmosphere outside the material outlet end portion of the kiln further comprises a pressure sensing means positioned adjacent said clinker inlet means of said upper compartment of the casing, first electrical conduit means connected at one end of said pressure sensing means with a relay device connected to said first conduit means at the other end thereof, rotative power means connected to said relay means by second electrical conduit means, and a damper connected to said power means to selectively dampen the spent air exiting from the upper compartment of the casing in response to atmospheric pressure variations sensed by said pressure sensing means.

12. The plant according to claim 11 further comprising a sluice device in communicating relationship with said clinker outlet means of the casing for the discharge of the cooled and dried clinker while simultaneously preventing substantial atmospheric air from entering the casing.

13. A plant for producing white cement which comprises:
 a. an inclined rotary kiln for burning granular or pulverous material to produce cement clinker, said clinker being discharged from a lower material outlet end portion of the kiln;
 b. a supply of a reducing agent such as fuel oil having a viscosity of approximately 110 centistokes;
 c. a stationary pipe connected to said supply of reducing agent and positioned within the kiln proper and adapted to spray the cement clinker with the reducing agent prior to its discharge from the lower material outlet end portion of the kiln;
 d. a first rotatable upper conveyor in the form of a cylindrical drum rotatable on its axis and having on its surface means defining a plurality of circumferentially adjacent compartments configured to receive sub-portions of said cement clinker discharged from the lower material outlet end portion of the kiln;
 e. means to introduce a predetermined amount of water successively into each compartment of the cylindrical drum as the first conveyor rotates and prior to receiving the hot clinker from the kiln;
 f. means to spray cooling water onto the clinker substantially immediately after the discharge thereof from the rotary kiln;
 g. a lower pneumatic air permeable conveyor positioned and adapted to receive the partially cooled hot clinker from the first upper rotatable conveyor and to facilitate movement of the hot clinker away from the rotary kiln and first rotatable conveyor;
 h. a first casing surrounding the lower material end portion of the rotary kiln in sealed relation therewith and a second casing substantially encompassing said rotatable conveyor and said lower conveyor in sealed communicating relation with the lower material outlet end portion of the kiln and the first casing, said first and second casings defining a passage therebetween for passage of water evaporating from the cement clinker;
 i. means to produce sub-atmospheric pressure of the atmosphere within said second casing so as to be less than the pressure of the atmosphere within the material outlet end portion of the kiln whereby cooling water evaporating from the clinker exiting the kiln passes to the second casing and thus the evaporated water is prevented from entering the kiln proper;
 j. means to direct cooling air into the second casing, through the air permeable lower conveyor and from said second casing;
 k. sensing means to detect the pressure of the atmosphere outside and adjacent the material outlet end portion of the kiln;
 l. dampening means to control the flow of cooling air through the second casing; and
 m. means to vary the dampening of said dampening means in response to signals transmitted by said pressure sensing means, the hot cement clinker discharged from said rotary kiln onto said rotatable conveyor after being subjected to said reducing agent within the kiln proper, and after discharge of said clinker, said water spray means being positioned and adapted to spray approximately 30–40% water by weight of clinker thereon while said rotatable conveyor rotates the clinker toward the lower conveyor at a rotational speed such that approximately 85–90% of water evaporates substantially immediately therefrom, said clinker being thereafter deposited upon said lower pneumatic conveyor and conveyed away from said rotary kiln, the speed of conveyance of said clinker being controlled to permit substantially all of the remaining cooling water to evaporate from the cement clinker while being conveyed away from said kiln.

14. A plant for producing cement which comprises:
a. an inclined rotary kiln for burning cement clinker having an upper material inlet end portion and a lower material outlet end portion for discharge of the clinker;
b. at least one stationary pipe positioned within the kiln proper and connected to a supply of reducing agent in the form of fuel oil having a viscosity of approximately 110 centistokes, said pipe being adapted to spray said reducing agent onto the clinker immediately prior to discharge of the clinker from the kiln;
c. a cylindrical drum rotatable about its axis and positioned adjacent the lower material outlet end portion of the kiln, said cylindrical drum having on its surface means defining at least one compartment configured to receive portions of the hot clinker discharged from the kiln;
d. means to spray cooling water onto the clinker substantially immediately after being discharged from the kiln and while being transferred onto said cylindrical drum;
e. a linear air permeable conveyor positioned below said cylindrical drum an adapted to receive clinker from said cylindrical drum and to facilitate movement of said clinker away from said cylindrical drum while the clinker is simultaneously cooled thereon;
f. a casing attached in substantially sealed communicating relationship with the lower material outlet end portion of the rotary kiln so as to enclose the atmosphere adjacent said lower material outlet end portion of the kiln; and
g. means to control the pressure of the atmosphere within said casing so as to be less than the pressure of the atmosphere within the material outlet end portion of the kiln to prevent cooling water evaporating from the cement clinker exiting the kiln from entering the kiln proper, thereby maintaining at minimum levels the water contact and heat losses occurring within the kiln proper.

* * * * *

UNITED STATES PATENT AND TRADEMARK OFFICE
CERTIFICATE OF CORRECTION

PATENT NO. : 4,059,396
DATED : November 22, 1977
INVENTOR(S) : Tage Halfdan Danø

It is certified that error appears in the above-identified patent and that said Letters Patent are hereby corrected as shown below:

Col. 2, line 49, "At" should read -- As --.

Col. 6, line 11, "kilm" should read -- kiln --.

Col. 6, line 12, "inlet and portion" should read -- inlet end portion --.

Col. 6, line 29, "trasnferred" should read -- transferred --.

Col. 10, line 4, "an" should read -- and --.

Signed and Sealed this

Eighth Day of August 1978

[SEAL]

Attest:

RUTH C. MASON
Attesting Officer

DONALD W. BANNER
Commissioner of Patents and Trademarks